United States Patent
Yoshimoto et al.

(10) Patent No.: US 7,094,491 B2
(45) Date of Patent: Aug. 22, 2006

(54) FUEL CELL

(75) Inventors: Yasunori Yoshimoto, Osaka (JP); Takashi Yasuo, Osaka (JP); Akira Hamada, Osaka (JP)

(73) Assignee: Sanyo Elecrtric Co., Ltd., Osaka (JP)

( * ) Notice: Subject to any disclaimer, the term of this patent is extended or adjusted under 35 U.S.C. 154(b) by 412 days.

(21) Appl. No.: 10/258,381

(22) PCT Filed: Feb. 12, 2002

(86) PCT No.: PCT/JP02/01153

§ 371 (c)(1),
(2), (4) Date: Oct. 23, 2002

(87) PCT Pub. No.: WO02/069432

PCT Pub. Date: Sep. 6, 2002

(65) Prior Publication Data

US 2003/0104265 A1 Jun. 5, 2003

(30) Foreign Application Priority Data

Feb. 23, 2001 (JP) .............................. 2001-048516

(51) Int. Cl.
*H01M 8/02* (2006.01)

(52) U.S. Cl. .......................................... 429/38; 429/26

(58) Field of Classification Search .................. 429/13, 429/17, 20, 24, 26, 34, 37, 38, 39, 41; 29/623.1
See application file for complete search history.

(56) References Cited

U.S. PATENT DOCUMENTS

| | | |
|---|---|---|
| 4,430,390 A | 2/1984 | Fekete |
| 4,873,155 A | 10/1989 | Hirota et al. |
| 5,041,344 A | 8/1991 | Kamoshita et al. |
| 5,484,666 A * | 1/1996 | Gibb et al. .................. 429/34 |

FOREIGN PATENT DOCUMENTS

| | | | |
|---|---|---|---|
| EP | 0 128 023 A | | 12/1984 |
| EP | 999605 A2 | | 5/2000 |
| EP | 1 347 528 A | | 9/2003 |
| JP | 62-066580 A | | 3/1987 |
| JP | 5-129032 A | | 5/1993 |
| JP | 7-288133 | | 10/1995 |
| JP | 08-213044 | * | 8/1996 |
| JP | 8-213044 | | 8/1996 |
| JP | 8-293318 | | 11/1996 |
| JP | 9035726 | | 2/1997 |
| JP | 11045728 | | 2/1999 |
| JP | 2000-12051 | | 1/2000 |
| JP | 2000-149977 | | 5/2000 |
| JP | 2000-357531 | * | 12/2000 |
| JP | 2001-6715 | | 1/2001 |
| WO | WO 00/49672 A | | 8/2000 |
| WO | WO 02/37587 A | | 5/2002 |

* cited by examiner

*Primary Examiner*—Michael Barr
*Assistant Examiner*—Robert Hodge
(74) *Attorney, Agent, or Firm*—Weingarten, Schurgin, Gagnebin & Lebovici LLP

(57) ABSTRACT

The present invention relates to a fuel cell devised to uniformly distribute and supply a reformed gas (or an oxidant or a coolant) while minimizing the increase in parts number, without making the construction complicated. The present invention has a gist of providing a fuel cell 5, piling up, by way of separators, multiple cells 1, and providing, in the stack 2, inner manifolds for distributing (or supplying or discharging) to these cells 1 a fuel, an oxidant or a coolant, wherein: a cylindrical/tubular piercing member 4 is provided in at least one inner manifold 6, and a proper gap is provided between the piercing member 4 and an inner wall of the inner manifold 6. The reformed gas supplied to the inner manifold 6, before being distributed to each cell 1, is flow-regulated by the piercing member 4. Thus, the reformed gas is distributed uniformly to each cell 1, a stable power generation is done, and performance of the fuel cell can be improved.

4 Claims, 3 Drawing Sheets

PRIOR ART

PRIOR ART

FUEL CELL

FIELD OF THE INVENTION

The present invention relates to a fuel cell, and more particularly relates to a fuel cell to distribute and supply a reformed gas uniformly to a plurality of cells that constitute the fuel cell.

BACKGROUND ART

A fuel cell normally reforms a hydrocarbons raw fuel gas into a hydrogen-rich gas by a reformer and supplies the reformed gas to a fuel electrode of the fuel cell, and at the same time, supplies the air taken from the outside to an air electrode, and by way of an electrolyte membrane comprised of solid polymer or the like, an electrochemical reaction takes place by hydrogen gas of the fuel electrode and oxygen gas of the air electrode, to generate electric power and water.

As a fuel cell like this, for example, a fuel cell as shown in FIG. 5 has been known, where a cell D, providing with a fuel electrode B on one face of an electrolyte membrane A and an air electrode C on the other face, is sandwiched with separators H and stacked in plurality to form a stack E; end plates F are attached to both ends of the stack E; and a plurality (four pieces in the figure) of tie rods G are pieced and fastened, to unify the stack E.

The fuel electrode B (and the same applied to the air electrode C) is normally supplied with a reformed gas by way of the separator H that forms a plurality of grooves (gas passage); and, in the separator H, as shown in FIG. 6 for example, a manifold I for supplying gas is formed at one end part and communicated with each of the grooves, a gas supply port J is provided at an end part of the manifold I, a manifold K for discharging gas is formed at the other end part and communicated with each groove, and a gas exhaust outlet L is provided at an end part of the manifold K. Accordingly, the reformed gas flows from the gas supply port J into the manifold I for supplying gas, flows from the manifold I for supplying gas through each groove into the manifold K for discharging gas, and is exhausted from the manifold K for discharging gas K through the gas exhaust outlet L to the outside.

In the fuel cell composed as described above, for the sake of cell performance, it is necessary for the reformed gas to be supplied uniformly to the fuel electrode B of each cell D, but the problem was that the requirement was not satisfied. That is, in the stack E, as shown schematically in FIG. 7, the gas supply port J is connected and a tunnel-shaped inner manifold M is formed, and the reformed gas is supplied from one end part (inlet side) of the inner manifold M. In this case, since the flow velocity of the reformed gas supplied to the inner manifold M flows drops little by little, the reformed gas flows more into cells D near the inlet but the reformed gas flows less into cells D far from the inlet. Thus, dispersion occurs in electromotive force between cells D and performance of the fuel cell drops.

To solve a problem like this, conventionally for example, a fuel cell is known, which provides a space for diffusing gas and a gas flow regulating plate at a gas intake part of a manifold on the inlet side to supply a reformed gas to each cell (Japanese Patent Laid-Open No.Hei.8-293318). Also, a fuel cell is disclosed, which forms a fuel gas channel to become shallower gently from the inlet side to the outlet side and provides a flow regulating plate in the fuel gas channel (Japanese Patent Laid-Open No. Hei.7-288133). Besides the fuel, distribution of an oxidant, the effect of which on a cathode (air electrode) reaction is big, is also a problem. Further, distribution of cooling water, which leads to a non-uniform temperature distribution, is also a problem.

However, these improved fuel cells involves shortcomings of making the construction complicate and increasing structural parts. Thus, the present invention aims to provide a fuel cell that can distribute and supply the reformed gas to each cell, without making the construction complicated, while minimizing the increase in parts count.

DISCLOSURE OF THE INVENTION

As means to attain the above object, the present invention has a gist of providing a fuel cell, forming a stack by piling up in plurality, by way of separators, cells each providing a fuel electrode on one face of an electrolyte membrane and an air electrode on the other face, and providing in the stack with supply and exhaust manifolds for distributing to these cells a fuel, an oxidant and a coolant (hereinafter, inner manifolds), wherein: a cylindrical/tubular piercing member pierces through at least one inner manifold of the stack, and a proper gap is interposed between the cylindrical/tubular piercing member and an inner wall of the inner manifold.

Also, the fuel cell has a gist that the cylindrical/tubular piercing member is at least one of tie rods constituting fastening members for fastening and unifying the stack.

Further, the fuel cell has a gist that a porous body is wound around the cylindrical/tubular piercing member, and the gap is closed by the porous body.

The fuel cell having the above-mentioned composition according to the present invention uses the cylindrical/tubular piercing member, which works as a tie rod for fastening and unifying the stack, as a flow regulating member for a gas supplied to the inner manifold, and so the construction does not become complicated.

Also, the fuel cell according to the present invention, in which the porous body is wound around the cylindrical/tubular piercing member, can further unify the flow regulation of the gas by closing the gap with the porous body. Further, the fuel cell according to the present invention has just a small increase in part number for the above-mentioned means.

BEST MODE FOR CARRYING OUT THE INVENTION

Next, embodiments of the fuel cell according to the present invention are described by referring to attached drawings.

Figure 1:
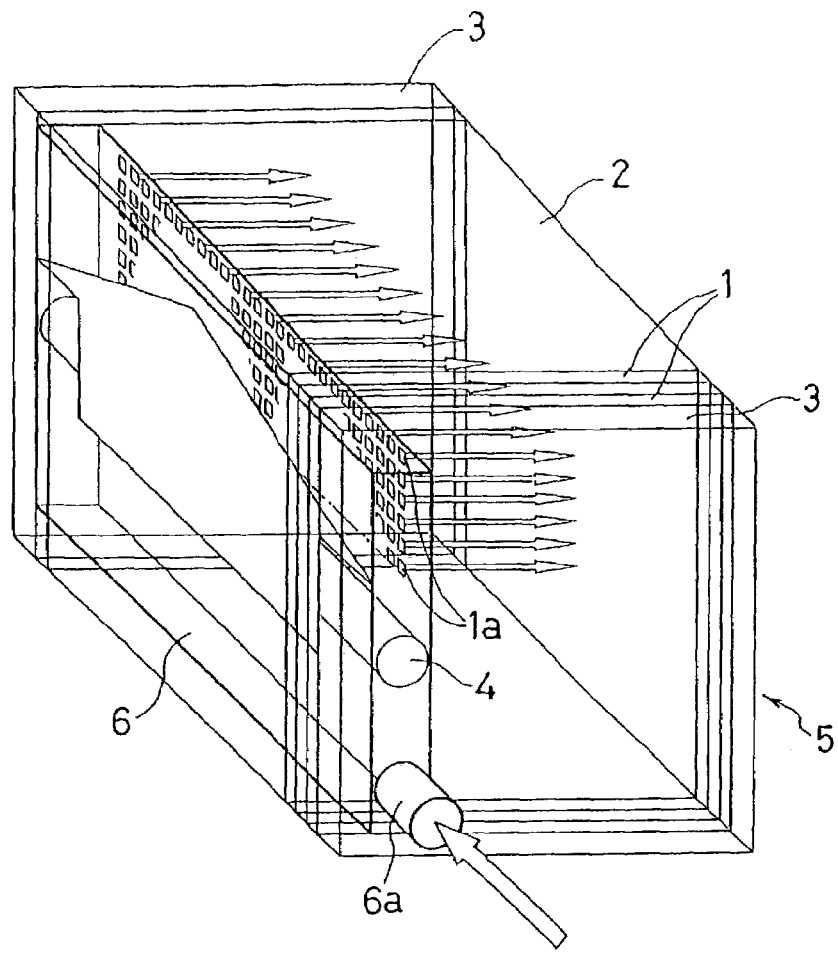
FIG. 1 is an explanatory drawing showing schematically an embodiment of the fuel cell according to the present invention.

FIG. 1 shows schematically the fuel cell of the present invention, where a stack 2 is formed by piling up a plurality of cells 1 by way of separators (omitted in the drawing), and a fuel cell 5 is composed by applying end plates 3 to both sides of the stack 2 and by fastening and unifying the stack 2 using a plurality of tie rods, including a cylindrical/tubular piercing member 4.

Figure 3:
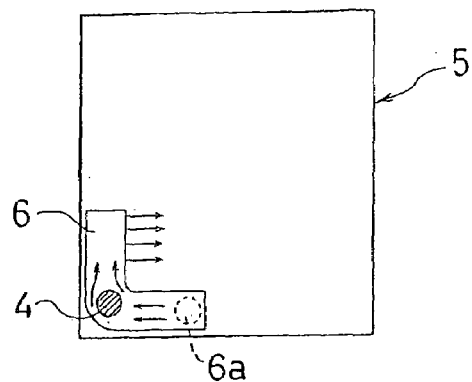
FIG. 3 is a schematic explanatory drawing showing another embodiment of the fuel cell according to the present invention viewed from a side.

In this case, though omitted from the drawing, the cell 1 is provided with a fuel electrode on one face of a solid polymer electrolyte membrane and an air electrode on the other face, and in these electrodes, a flow field for a reformed gas (fuel chamber) and a passage for air (air chamber) are arranged by way of separators, respectively. Also, with regard to the multiple tie rods, tie rods other than the piercing member 4, not illustrated, normally fasten four corners of the fuel cell 5, and the piercing member 4 pierces through an inner manifold 6 and works concurrently as a flow regulating member for the reformed gas supplied to the inner manifold 6. The piercing member 4 can be positioned at a corner of the fuel cell 5 as shown in FIG. 3, and in this case, it is not necessary to increase the number of tie rods.

The inner manifold 6 is arranged to pierce through the inside of the fuel cell 5 along the thickness direction of the stack 2 and form a sealed space, a gas supply port 6a is arranged at one end part, and a side part faces a gas supply port to the each cell 1, namely a gas passage inlet 1a of a separator on the fuel electrode side (omitted in the drawing). Accordingly, the reformed gas (fuel) supplied from the gas supply port 6a to the inner manifold 6 is supplied from the gas passage inlet 1a of the separator on the fuel electrode side to each cell 1. As a gas supply port to each cell 1, a gas supply manifold (omitted in the drawing) of the separator on the fuel electrode side may also be used. In this case, the reformed gas is supplied by way of the gas supply manifold to each cell.

The reformed gas supplied to each cell 1 causes an electrochemical reaction between hydrogen gas of the reformed gas and oxygen gas (oxidant) of the air supplied to the air electrode by way of an electrolyte membrane, and electric power and water is generated. The reformed gas left without reacting in each cell 1 is flown to the gas exhaust manifold and exhausted from a gas exhaust outlet. The unreacting reformed gas is sent to a burner of a reformer and burned.

Figure 2:
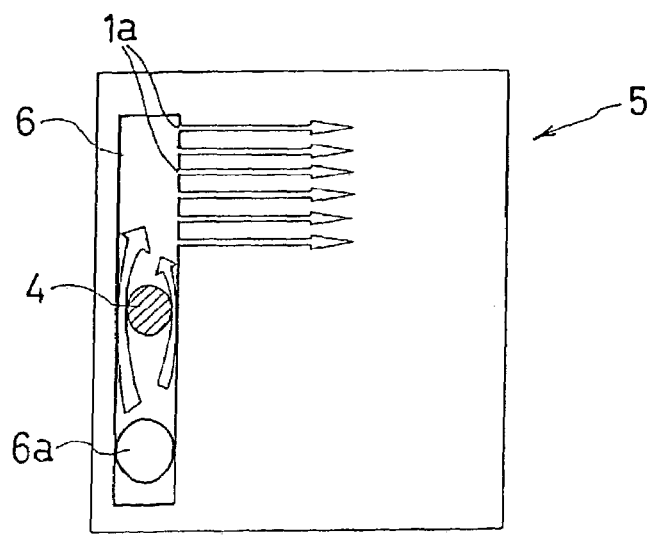
FIG. 2 is a schematic explanatory drawing showing FIG. 1 viewed from a side.

The piercing member 4, as shown schematically in FIG. 2, is positioned between the gas supply port 6a to the inner manifold 6 and the gas passage inlet 1a to the each cell 1 from the inner manifold 6, and arranged for separation, and between the piercing member 4 and the inner manifold 6, proper spaces are generated on both sides along the length direction of the piercing member 4.

In the fuel cell 5 of the present invention composed like this, the reformed gas supplied into the inner manifold 6 is flow-regulated because a flow passage is narrowed by the piercing member 4, and because of this, gas dispersion is promoted in the inner manifold 6 and the distribution/supply of gas to each cell 1 is unified. That is, in this case, performance of the fuel cell 5 can be improved, without causing any dispersion in supply volume of reformed gas between cells near the gas supply port 6a and cells far from the gas supply port 6a, and without causing any dispersion in electromotive force between cells 1. The gas flow regulating action by the piercing member 4 can also be produced by providing a gap only on one side of the piercing member 4.

Figure 4:
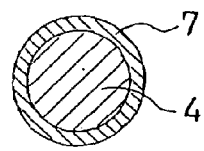
FIG. 4 is a cross-section drawing of a piercing member of the other embodiment of the fuel cell according to the present invention.
Figure 5:
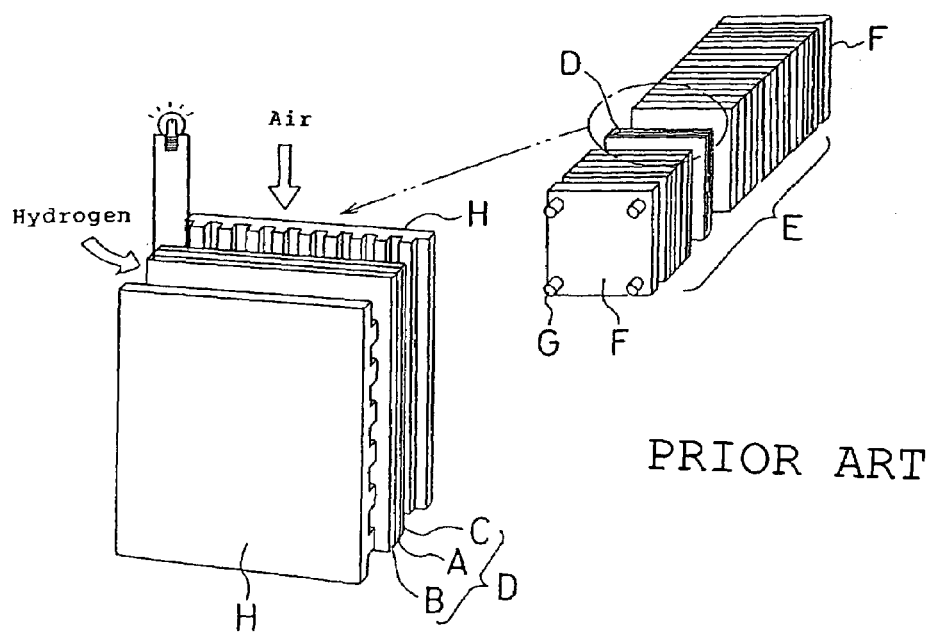
FIG. 5 is an explanatory drawing showing a composition of a typical fuel cell.
Figure 6:
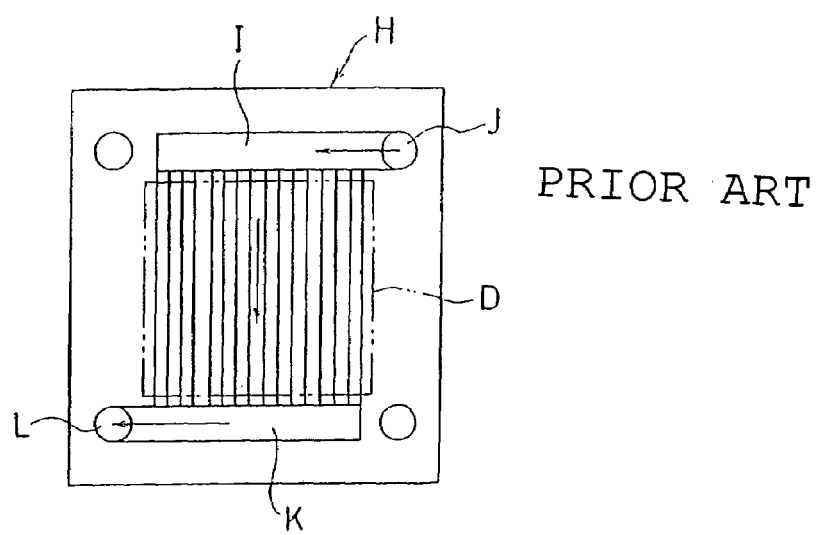
FIG. 6 is an explanatory drawing showing a separator of the typical fuel cell.
Figure 7:
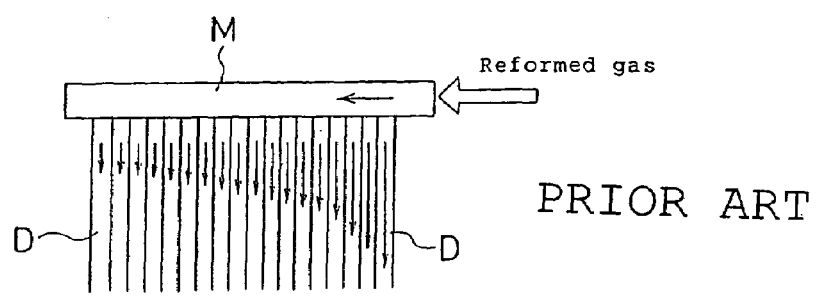
FIG. 7 is an explanatory drawing showing schematically the supply condition of a reformed gas to each cell of a fuel cell of the prior art.

FIG. 4 shows a cylindrical/tubular piercing member in another embodiment of the present invention in an example of winding a porous body 7 around the outer perimeter face of the piercing member 4. As the porous body 7, for example, a mesh-shaped member, a material having pinholes, a porous material or the like can be used, and since the reformed gas is hot, for example, rayon/polyester resin, aramid/polyester resin and other heat resistant resin is preferable.

By forming a composition so that gaps between the inner manifold 6 are closed using a piercing member wound around with the porous body 7, distribution of gas to each cell 1 can be further unified by further increasing gas dispersion by the porous body 7. The above description is given using the reformed gas as an example, but fuels like hydrogen, methanol and the like are also available. Also, the same effect can be attained to the air (oxidant) and the cooling water (coolant).

INDUSTRIAL APPLICABILITY

According to the present invention, since the reformed gas supplied to the inner manifold of the fuel cell is flow-regulated by the cylindrical/tubular piercing member before it is distributed to each cell, it is possible to uniformly distribute/supply fuel, oxidant/cooling water to each cell without making the construction complicated, while minimizing the increase in parts count, and as a result, a stable power generation can be done without causing dispersion between cells, and performance of the fuel cell can be improved.

The invention claimed is:

1. A fuel cell, comprising
a plurality of individual cells formed in a stack,
the cells separated by separators,
the cells each comprising a fuel electrode on one face of an electrolyte membrane and an oxidant electrode on the other face, and
said stack further comprising supply and exhaust inner manifolds for distributing to and receiving from these cells a fuel gas supply, an oxidant and a coolant supply, and exhaust therefrom, respectively, said manifolds having at least one side part, a length and at least one end wall havihg a plane;
a cylindrical fuel gas supply port having a perimeter and a central axis, the supply port penetrating one end wall of a fuel gas supply inner manifold such that the fuel gas supply enters the fuel gas supply inner manifold having an average gas supply flow direction parallel to the central axis of the supply port;
a side part of the inner manifold faces a gas passage inlet of the separator on the fuel electrode side,
cylindrical piercing member having a length, a central axis, a perimeter and an external, volume defined by the length and perimeter, the piercing member extends lengthwise through the stack and pierces through an inner manifold of the stack, including pierces through at least the fuel gas supply inner manifold, wherein
the piercing member is positioned between the gas supply port and the gas passage inlet such that the fuel gas supply inner manifold is separated by the piercing member into first and second volumetric regions, each volumetric region having a length and each volumetric region having a volume greater than the external volume of the piercing member, in the plane of the end wall of the fuel gas supply inner manifold penetrated by the supply port, the perimeter of the piercing member and the perimeter of the fuel gas supply port have no overlap, and the central axis of the gas supply port is parallel to the central axis of the piercing member, such that the flow direction of the fuel gas supply entering from the fuel gas supply port into the first volumetric region of the gas supply inner manifold is substantially parallel to the central axis of the piercing member and a fuel gas supply flowing into the first volumetric region of the manifold can transit the length of the first volumetric region of the manifold in a straight path without colliding with the piercing member;

a proper gap is interposed between said cylindrical piercing member and an inner wall of the fuel gas supply inner manifold along the length direction of the piercing member;

wherein the arrangement directs a flow of fuel gas through the proper gap substantially orthogonal to the flow direction of the fuel gas supply entering from the supply port into the first volumetric region of the gas supply inner manifold and the flow of fuel gas through the gas supply inner manifold from the first volumetric region to the second volumetric region is flow-regulated by the piercing member.

2. The fuel cell according to claim 1, wherein said cylindrical piercing member is at least one of tie rods constituting fastening members for fastening and unifying said stack.

3. The fuel cell according to claim 1, wherein a porous body is wound around said cylindrical piercing member, and said gap is closed by the porous body.

4. The fuel cell according to claim 2, wherein a porous body is wound around said cylindrical piercing member, and said gap is closed by the porous body.

* * * * *

UNITED STATES PATENT AND TRADEMARK OFFICE
CERTIFICATE OF CORRECTION

PATENT NO. : 7,094,491 B2
APPLICATION NO. : 10/258381
DATED : August 22, 2006
INVENTOR(S) : Yasunori Yoshimoto et al.

It is certified that error appears in the above-identified patent and that said Letters Patent is hereby corrected as shown below:

Column 4, claim 1, line 45, "these cells" should read --the cells--;

Column 4, claim 1, line 48, "havihg" should read --having--; and

Column 4, claim 1, line 57, "cylindrical" should read --a cylindrical--.

Signed and Sealed this

Twenty-fourth Day of July, 2007

JON W. DUDAS
*Director of the United States Patent and Trademark Office*